United States Patent [19]
Orne

[11] Patent Number: 5,839,647
[45] Date of Patent: Nov. 24, 1998

[54] WELDING CLAMP FOR PIPE FITTINGS

[75] Inventor: Donald A. Orne, Butte, Mont.

[73] Assignee: MSE Technology Applications, Inc., Butte, Mont.

[21] Appl. No.: 898,224

[22] Filed: Jul. 22, 1997

[51] Int. Cl.[6] .................................................. B23K 37/04
[52] U.S. Cl. ........................... 228/212; 228/44.3; 269/49
[58] Field of Search .................................. 228/44.3, 212; 269/49

[56] References Cited

U.S. PATENT DOCUMENTS

| | | | |
|---|---|---|---|
| 2,172,461 | 9/1939 | Whitescarver | 269/49 |
| 2,387,154 | 10/1945 | Kalwitz | 228/212 |
| 4,615,514 | 10/1986 | Hamlin | 269/49 |

Primary Examiner—Patrick Ryan
Assistant Examiner—Jeffrey T. Knapp
Attorney, Agent, or Firm—Peter Tribulski

[57] ABSTRACT

Weldolets or threadolet type fittings are welded onto pipe while being clamped in position with a clamp assembly that includes a threaded bolt, a wing nut, a positioning star with tapered arms which can slide along the axis of the bolt, and a tapered swivel anchor that is pivotally connected to an end of the bolt. In operation, the fitting is positioned at a hole in the pipe. The swivel anchor and bolt are inserted through the fitting into the pipe. The positioning star is engaged with a free end of the fitting and then the wing nut is tightened to produce a forced engagement between the positioning star and the fitting. This positions the fitting into concentric alignment with the hole and orthogonal alignment with the pipe.

6 Claims, 2 Drawing Sheets

WELDING CLAMP FOR PIPE FITTINGS

FIELD OF THE INVENTION

The invention relates to welding of pipe fittings.

BACKGROUND OF THE INVENTION

There are many instances in which it is desired to tap into a main pipe with another branch pipe. Typically this is done by making a hole in the main pipe and then securing the branch pipe to the main pipe at the hole location. One device commonly used to facilitate the attachment is a cylindrical bushing which is adapted to be welded in place around a hole in a main pipe. The bushing has internal pipe threads or an internal bore into which a branch pipe is connected. These bushings or fittings are known in the industry under various names such as threadolets or weldolets.

When welding a weldolet or threadolet type fitting at a hole location in a pipe, it is imperative that the fitting be positioned concentrically with the hole. It is also necessary that an axis of the fitting is maintained in an orthogonal relationship with an axis of the main pipe. This assures that the axes of the main pipe and the branch pipe are orthogonal. It can be appreciated that even a minor error in concentricity or orthogonality of the fitting will reflect into a large error of alignment of the branch pipe which is finally connected to the welded fitting.

Various techniques have been used in the prior art to position and hold fittings while they are welded onto pipes. These techniques, at their simplest, include manual positioning and holding by a second worker assisting a welder. In attempts to reduce a need for a second person, some clamping techniques have been devised that permit welding of the fitting with only a single worker. Heretofore, these prior art clamping techniques have been complex and cumbersome. In many cases the clamps produce limitations on the types of welds that can be made on the fittings.

For example, a clamp for holding a weldolet fitting in place during welding is disclosed in U.S. Pat. No. 4,611,743, (Williams) issued Sep. 16, 1986. When the Williams clamp is used, the weldolet fitting must be supported away from a main pipe with spacers. The welding process must be performed in two stages. A first stage involves tack welding while the clamp and spacers are in position on the pipe. A second stage of welding is done after the clamp and spacers are removed. A complete welding of the weldolet fitting is not possible with clamp in position.

It is desirable therefore to provide a clamping method that will facilitate the welding of weldolet and threadolet type fittings with only a single worker. In providing such a clamping method it is desirable to facilitate a welding operation which can begin and proceed to completion without a need to remove a clamp. Additionally it is desirable that the clamp maintain concentricity of the axes of a hole and the fitting and orthogonality of the axes of the fitting and the main pipe during welding.

SUMMARY OF THE INVENTION

The invention is directed to an apparatus for clamping a weldolet or threadolet type fitting onto a pipe to facilitate welding therebetween. The apparatus comprises a threaded bolt member and a threaded nut member adapted to be engaged with the threaded bolt member. A positioning member is adapted to be slidably engaged with the bolt member along a central axis of the positioning member. The positioning member has tapered arms extending from its central axis. A tapered toggle member is adapted to be pivotally engaged with an end of the bolt member.

Viewed from another perspective the present invention is directed to a method for welding a threadolet or weldolet type fitting at a hole location in a wall of a pipe. The method comprises the following steps. The fitting is positioned with its axis substantially aligned with the hole. A threaded toggle bolt with an attached swivel anchor is inserted into the fitting and the hole. A positioning star with tapered arms is slid along the toggle bolt into engagement with a free end of the fitting. A threaded nut on the toggle bolt is tightened to force the positioning star against the free end of the fitting, whereby an axis of the fitting is forced into concentric alignment with the hole and orthogonal alignment with an axis of the pipe. The fitting and pipe are welded together while the fitting is held in such aligned position.

The invention will be better understood from the following detailed description taken in consideration with the accompanying drawings and claims.

The drawings are not necessarily to scale.

DETAILED DESCRIPTION

Figure 1:
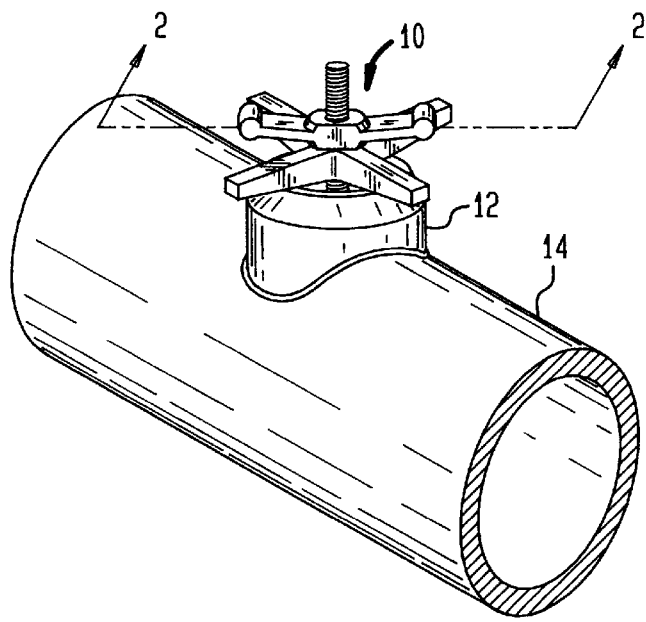
FIG. 1 shows a perspective view of a clamp assembly in accordance with the present invention.

Referring now to FIG. 1, a clamp assembly 10 is shown in an operative position holding a weldolet or threadolet type fitting 12 (hereinafter referred to as a fitting) at a desired location on a pipe 14.

Figure 2:
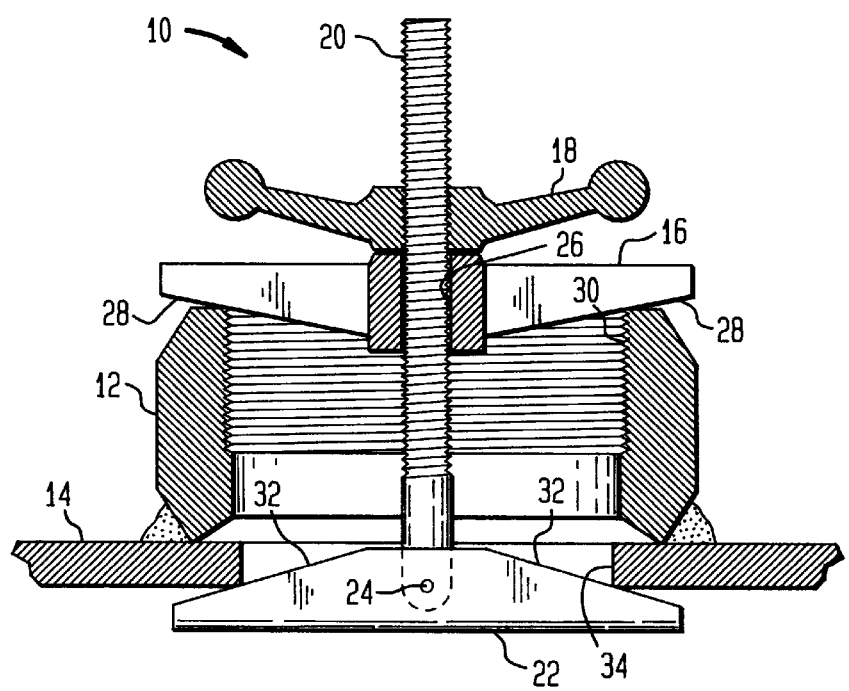
FIG. 2 is a cross-sectional view of the clamp assembly of FIG. 1 taken along the lines 2—2.

Referring now to FIG. 2, the clamp assembly 10 is shown in detail. The clamp assembly 10 is comprised of a positioning star 16, a wing nut 18, a toggle bolt 20, a swivel anchor 22 and a pin 24. The toggle bolt 20 and the wing nut 18 are engaged with each other with conventional machine screw threads. The positioning star 16 is provided with a clearance hole 26 that permits the star 16 to move axially long the toggle bolt 20 in response to force generated by the wing nut 18. The swivel anchor 22 is connected to the toggle bolt 20 by the pin 24 in a manner which permits the anchor to swivel, i.e. rotate about the axis of the pin 24.

The positioning star 16 has tapered arms 28 which engage with inside edges of a hole 30 in the fitting 12. The swivel anchor 22 has tapered arms 32 which engage with inside edges of a hole 34 in the pipe 14.

When the wing nut 18 is tightened on the toggle bolt 20, the tapered arms 28 of the positioning star 16 and the tapered arms 32 of the swivel anchor each operate to force the toggle bolt 20 into concentric alignment with an axis of the hole 34 in the pipe 14. This produces a corresponding positioning force on the fitting 12. The fitting 12 is forced into concentric alignment with the hole 34. Additionally, an axis of the weldolet 12 is forced into an orthogonal relationship with an axis of the pipe 14.

Figure 3:
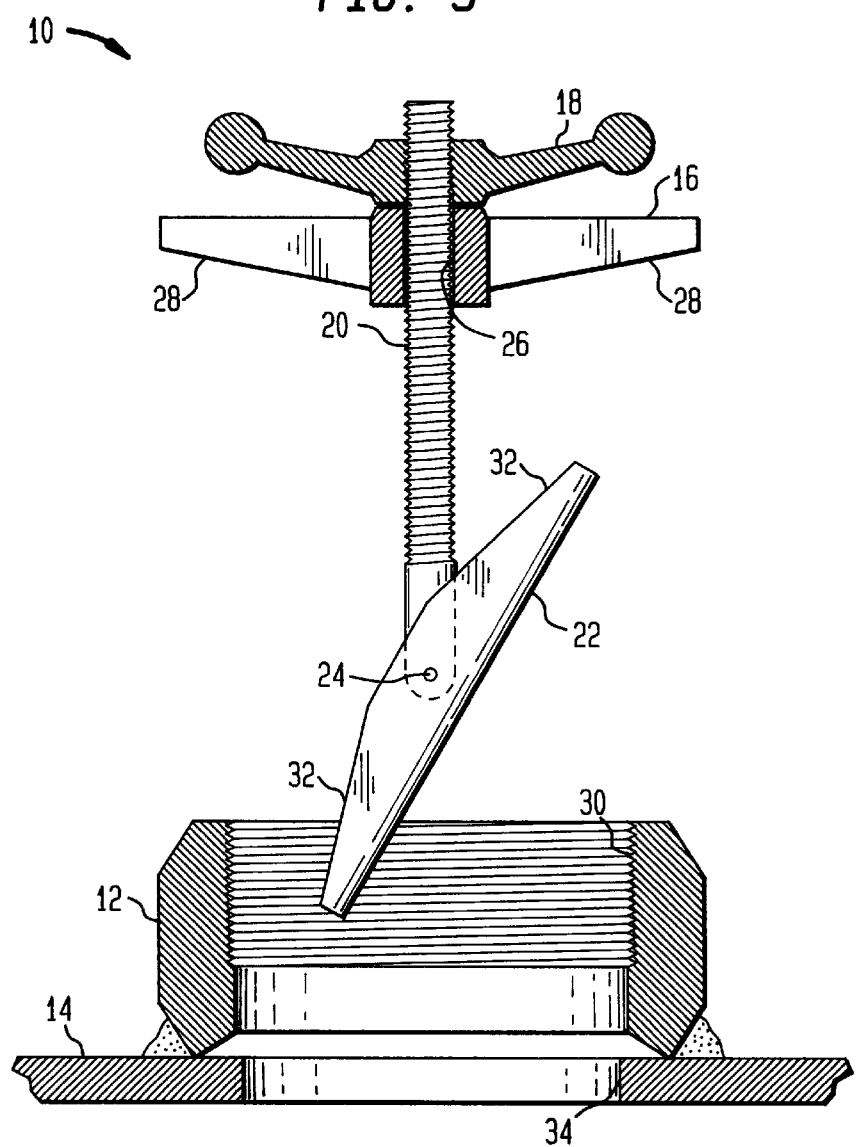
FIG. 3 shows the clamp assembly of FIG. 2 in an insertion mode.

An important element of the present invention is the ease with which the clamp assembly 10 can be inserted into a work location. This can be seen by referring to FIG. 3. The swivel anchor 22 is pivoted on the pin 24 so that it passes readily through the hole 34. The wing nut 18 and the positioning star 16 are held clear from the fitting 12. Then clamp assembly 10 is easily inserted into the fitting 12 and the hole 34.

Figure 4:
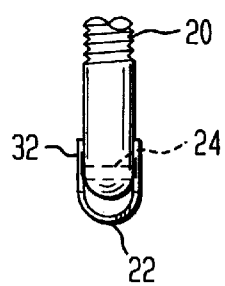
FIG. 4 is an end view of swivel anchor of the clamp assembly of FIG. 2.

Referring to FIG. 4 one can see that the swivel anchor is formed with a U-shaped cross-section. A space between legs of the U-shape is large enough to provide clearance for the toggle bolt 20. This permits the swivel anchor 22 to freely rotate around the pin 24 so that the swivel anchor can be readily inserted into the hole 34 of the pipe 14 of FIG. 3.

The clamp assembly 10 of the present invention has numerous advantages. One important advantage is that one of the clamp assemblies 10 of a particular size can be used to facilitate welding of a wide range of sizes of weldolet or threadolet type fittings. The range of fitting size applications is limited on the small end only by the size of the hole 34 into which the swivel anchor 22 can be inserted. The range is limited on the large end by the maximum diameter of the hole 34 in which the swivel anchor 22 can maintain a grip.

As practical matter, it is perfectly reasonable to have as few as three sizes of the clamp assemblies for a range of fitting sizes, from fractions of an inch to four inches in diameter. This is a very important concept for a welder who uses these clamp assemblies 10. A typical welder can keep as few as three of these clamp assemblies 10 in his tool collection and have the capability of welding a full range of sizes of weldolets and threadolets.

Another important advantage of the present invention is the ease with which the clamp assemblies 10 can be inserted into a work location. In many instances it becomes necessary to tap into a pre-existing pipe which is installed in a cluttered and confined workspace. In some instances, it is necessary that welding is performed overhead. It is clear that the clamp assembly 10 fills a great need in these settings because it can be inserted and tightened by a single person without any special wrenches or tools.

It is also advantageous to a welder to have the clamp assembly 10 completely out of the field of a welding operation. There are no components of the clamp assembly 10 which interfere with completing a welding operation once it has begun.

It is to be appreciated and understood that the specific embodiments of the invention are merely illustrative of the general principles of the invention. Various modifications may be made by those skilled in the art which are consistent with the principles set forth. For example, the positioning star 16 is shown with four tapered arms 28. The positioning star 16 could be made with two or three or any number of arms and still be effective.

What is claimed is:

1. A clamp assembly for clamping a fitting onto a pipe to facilitate welding therebetween, which assembly comprises:
   a threaded bolt member;
   a threaded nut member adapted to be engaged with the threaded bolt member;
   a positioning member adapted to be slidably engaged with the bolt member along a central axis of the positioning member;
   the positioning member having tapered arms extending from the central axis thereof; and
   a tapered toggle member adapted to be pivotally engaged with an end of the bolt member.

2. The clamp assembly of claim 1 wherein the tapered toggle member has a U-shaped cross section which facilitates pivotal movement of the toggle member.

3. A welding clamp for holding fittings on a pipe in concentric alignment with a hole in a wall of the pipe and in orthogonal alignment with an axis of the pipe during welding of the fitting to the pipe, which clamp comprises:
   a threaded toggle bolt;
   a swivel anchor pivotally attached to an end of the toggle bolt;
   the toggle bolt and swivel anchor being adapted to be insertible into the fitting and the hole in the pipe;
   the swivel anchor being adapted to engage with the wall of the pipe after being inserted into the hole in the pipe;
   a positioning star having tapered arms adapted to be slid along an axis of the toggle bolt into engagement with a free end of the fitting;
   a threaded nut engaged with the threads of the toggle bolt and adapted to produce force on the positioning star when tightened against the star; and
   the positioning star and swivel anchor being adapted to develop aligning forces on the fitting when the nut is tightened against the positioning star.

4. The welding clamp of claim 3 wherein the combined elements of the clamp provide for holding the fittings in direct contact with the pipe during a complete welding of the fitting.

5. A method for welding a fitting at a hole location in a wall of a pipe which comprises the steps of:
   positioning the fitting with its axis substantially aligned with the hole;
   inserting a threaded toggle bolt with an attached swivel anchor into the fitting and the hole;
   sliding a positioning star with tapered arms along an axis of the toggle bolt into engagement with a free end of the fitting;
   tightening a threaded nut on the toggle bolt to force the positioning star against the free end of the fitting, whereby an axis of the fitting is forced into concentric alignment with the hole and orthogonal alignment with an axis of the pipe; and
   welding the fitting to the pipe while the fitting is held in such aligned position.

6. The method of welding of claim 5 wherein the fittings are held in direct contact with the pipe during a complete welding of the fitting.

* * * * *